W. BALLANTINE.
STUMP PULLER.
APPLICATION FILED SEPT. 3, 1919.

1,359,219.

Patented Nov. 16, 1920.

INVENTOR
William Ballantine
BY
Sebastian...&Co.
ATTYS.

UNITED STATES PATENT OFFICE.

WILLIAM BALLANTINE, OF MISSION CITY, BRITISH COLUMBIA, CANADA, ASSIGNOR OF ONE-FOURTH TO JAMES CLARK McINTYRE AND ONE-FOURTH TO FRED. HUNTER, BOTH OF MISSION CITY, BRITISH COLUMBIA, CANADA.

STUMP-PULLER.

1,359,219.  Specification of Letters Patent.  Patented Nov. 16, 1920.

Application filed September 3, 1919. Serial No. 321,449.

*To all whom it may concern:*

Be it known that I, WILLIAM BALLANTINE, a subject of the King of Great Britain, and a resident of the town of Mission City, in the Province of British Columbia, Canada, have invented certain new and useful Improvements in Stump-Pullers, of which the following is a specification.

My invention relates to improvements in stump pullers, and the object of my invention is to devise a machine of this character which, while being light and compact, is of great power, and which is easily transported from place to place and capable of being operated by one man with great ease, rapidity and continuity of operation.

I attain this object by the construction illustrated in the accompanying drawings in which—

Similar figures of reference indicate similar parts throughout the several views.

Figure 2:
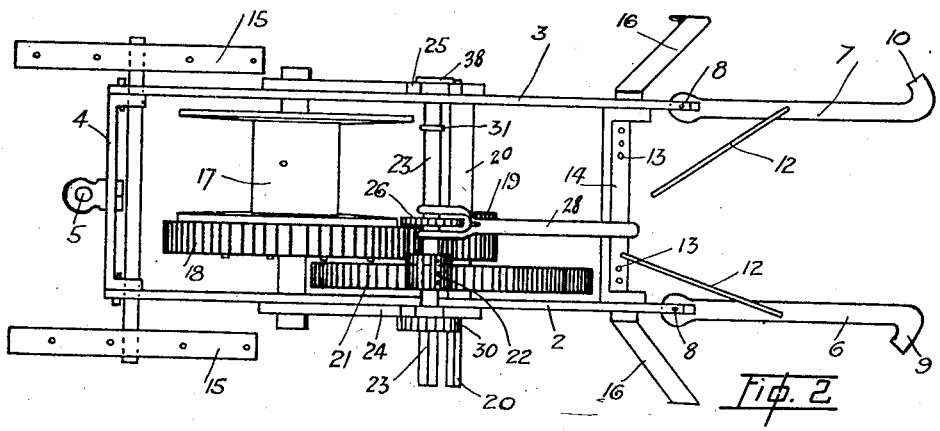
Fig. 2 is a plan view.
Figure 3:
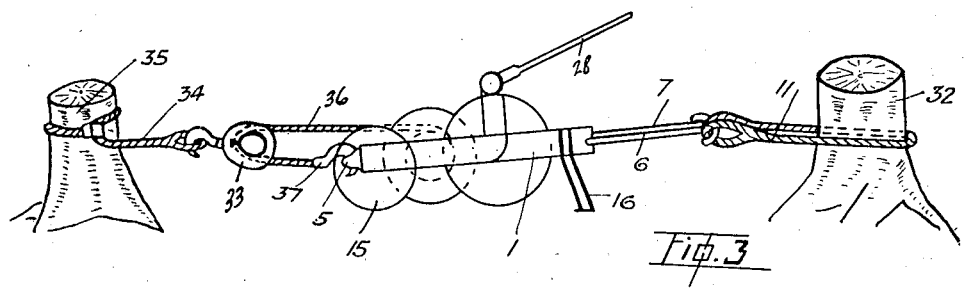
Fig. 3 is a view illustrating the operation of the invention.

1 indicates generally the frame of the machine formed of the two side members 2 and 3 connected together at their forward ends by a transverse member 4 provided at midlength with an eyebolt 5 while to the rear ends of the members 2 and 3 handles 6 and 7 are pivotally connected as indicated at 8 in Fig. 2, the free ends of the handles being formed hook-shaped, as at 9 and 10 so that an anchor rope, indicated by the numeral 11 in Fig. 3, may be attached thereto, as hereinafter described. The handles 6 and 7 are maintained in any pivotally adjusted position by means of stay rods 12 one end of each of which engages its respective handle while the other end is adapted to engage any one of a series of holes 13 provided in a transverse member 14 connecting the rear ends of the members 2 and 3, as shown in Fig. 2. The frame 1 is mounted at its forward end on wheels 15 and at its rear end it is supported on legs 16, from which it will be seen that the device is constructed substantially similar to a wheelbarrow and as such may be moved about with great facility.

17 indicates the drum, rotatably mounted within the frame toward its forward end and provided with a large gear 18 which meshes with a large pinion 19 secured to a transverse shaft 20 rotatably mounted on the frame and on which shaft to one side of the drum gear 18 is secured another large gear 21 meshing with a pinion 22 secured to a transverse shaft 23 rotatably and slidably mounted in vertical brackets 24 and 25 secured to the side members 2 and 3, this shaft 23 being also provided with a rigidly secured ratchet wheel 26 with which coöperates a pawl 27 carried by a handle 28 swingably mounted on the shaft 23, the operation of which handle in a rearward direction rotates the wheel 26 and shaft 23, backward movement of the wheel 26 being prevented by means of a suitably mounted pawl 29 in spring-pressed engagement with the teeth of a wheel 30 secured on the shaft 23 outside of bracket 24 while the slidable movement transversely of the shaft to disengage the pinion 22 from gear 21 when not required is limited by means of a collar 31 secured thereon. When the pinion 22 and gear 21 are in use, however, the shaft 23 is kept from transverse movement by means of a cap 38 which is secured to bracket 25 and which may be swung up to permit transverse movement of the shaft when disengaging the pinion 22. The ends of the drum shaft, and of shafts 20 and 23, are squared so that a suitable operating handle may be placed on them as required.

Figure 1:
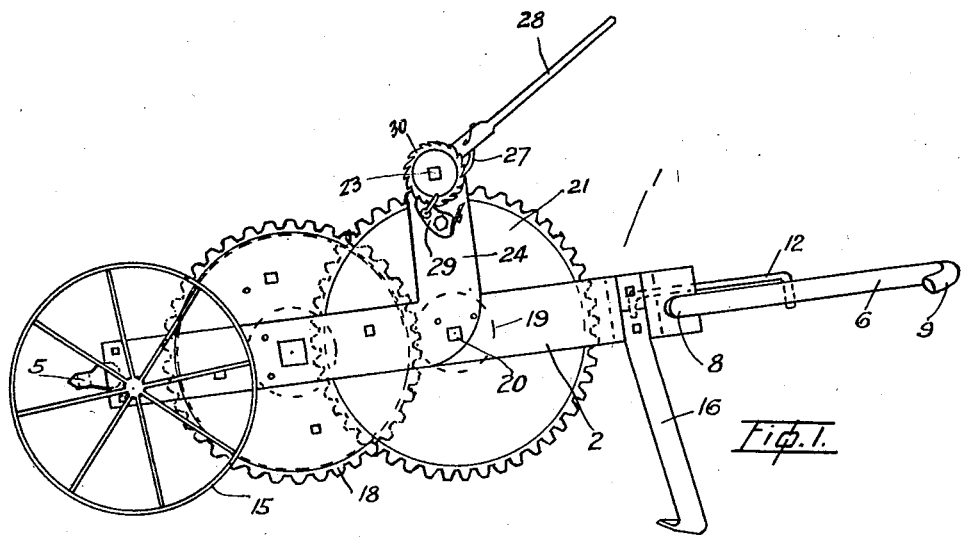
Figure 1 is a side elevation of the machine.

The manner in which the machine is operated may be briefly described as follows: For small and medium sized stumps the rear anchorage is all that is required, this being obtained by passing the rope 11 around a stump 32, as indicated in Fig. 3, the pulling cable being then simply attached to the stump to be pulled and to the drum, while for large stumps a block 33 attached to a choker 34 on the stump 35 to be pulled may be used, the pulling cable 36 in that case passing through the block 33 and being provided with a hook 37 adapted to engage in the eye bolt 5. By the arrangement of gears shown in Figs. 1 and 2, that is, high gear, medium gear, and low gear, the high gear being the drum gear 18 when operated alone, the medium gear the operation of gear 18 by pinion 19, and the low gear the operation of gear 21 by pinion 22, the whole process of pulling a stump may be regulated both as to speed and power since when the strain is light the speed is great due to the operation of the drum by rotation of the handle directly mounted on the drum shaft. As the strain increases the handle is placed on the shaft 20 and the pinion 19 rotated, thus lessening the speed to take the heavy strain until the tension is great enough to require the use of the ratchet 26 to operate gear 22, or the low gear, until the heavy part of the pull is over, when the speed may be again increased by changing back from low to medium and from medium to high gear as when starting the operation, the whole process being simply first from high gear to medium gear, from medium gear to low gear, from low gear to medium, and finally from medium gear to high gear, thus leaving the machine ready for the next stump without further adjustment.

From the foregoing it will be seen that I have devised a simple and easily operated stump puller which possesses great power while being light, compact, and readily transportable.

What I claim as my invention is—

1. A stump puller comprising a wheeled frame, laterally adjustable gripping handles at the rear of said frame whereby the same may be wheeled, means for securing the handles in adjusted position, a drum rotatably mounted on the frame, and mechanism associated with said drum for rotating it at different speeds.

2. A stump puller comprising a wheeled frame, gripping handles at the rear of said frame whereby the same may be wheeled, said handles being pivotally connected so as to be capable of being spread laterally at their free ends, a drum rotatably mounted on the frame, and mechanism associated with said drum for rotating it at different speeds.

3. A stump puller comprising a wheeled frame, gripping handles at the rear of said frame whereby the same may be wheeled, said handles being pivotally connected so as to be capable of being spread laterally at their free ends, means for maintaining said handles in any adjusted position, a drum rotatably mounted on the frame, and mechanism associated with said drum for rotating it at different speeds.

4. A stump puller comprising a wheeled frame, gripping handles pivotally connected at one end to the rear of said frame and hook shaped at their free ends so that an anchor rope may be attached thereto, a drum rotatably mounted on the frame, and mechanism associated with said drum for rotating it at different speeds.

5. A stump puller comprising a wheeled frame, gripping handles pivotally connected to the rear end of said frame for wheeling it, said handles being hook shaped at their free ends, a drum rotatably mounted adjacent the forward end of the frame provided with a gear, a manually operable transverse shaft rotatably mounted to the rear of said drum provided with a pinion meshing with the drum gear and also provided with a large gear, a transverse shaft rotatably mounted above the frame provided with a pinion, said shaft being laterally slidable to carry said pinion into or out of engagement with said large gear, and a pawl and ratchet mechanism mounted on said shaft for operating it.

6. A stump puller comprising a rectangular frame mounted at its forward end on wheels and having supporting legs at its rear end, said frame having transverse members at its forward and rear ends, the forward member being provided with an eyed member and the rear one with a series of holes, gripping handles pivotally connected to the rear end of said frame for wheeling it, said handles being capable of being spread laterally and formed hook shaped at their free ends and having stay bars adapted for engagement in said holes to maintain said handles in any adjusted position, a drum rotatably mounted adjacent the forward end of said frame provided with a gear, a manually operable transverse shaft rotatably mounted to the rear of said drum provided with a pinion meshing with the drum gear and also provided with a large gear, a transverse shaft rotatably mounted above the frame provided with a pinion, said shaft being laterally slidable to carry said pinion into or out of engagement with said large gear, a pawl and ratchet mechanism mounted on said shaft for operating it in a forward direction, and means for holding said shaft against inadvertent backward movement.

Dated at Mission City this 26th day of July, 1919.

WILLIAM BALLANTINE.